This invention relates to an oxidation-resistant cellulose sheet and a method for the preparation thereof. More particularly, it relates to an oxidation-resistant cellulose sheet containing polyvinyl butyral resin which is useful as a battery separator, and a method for its manufacture.

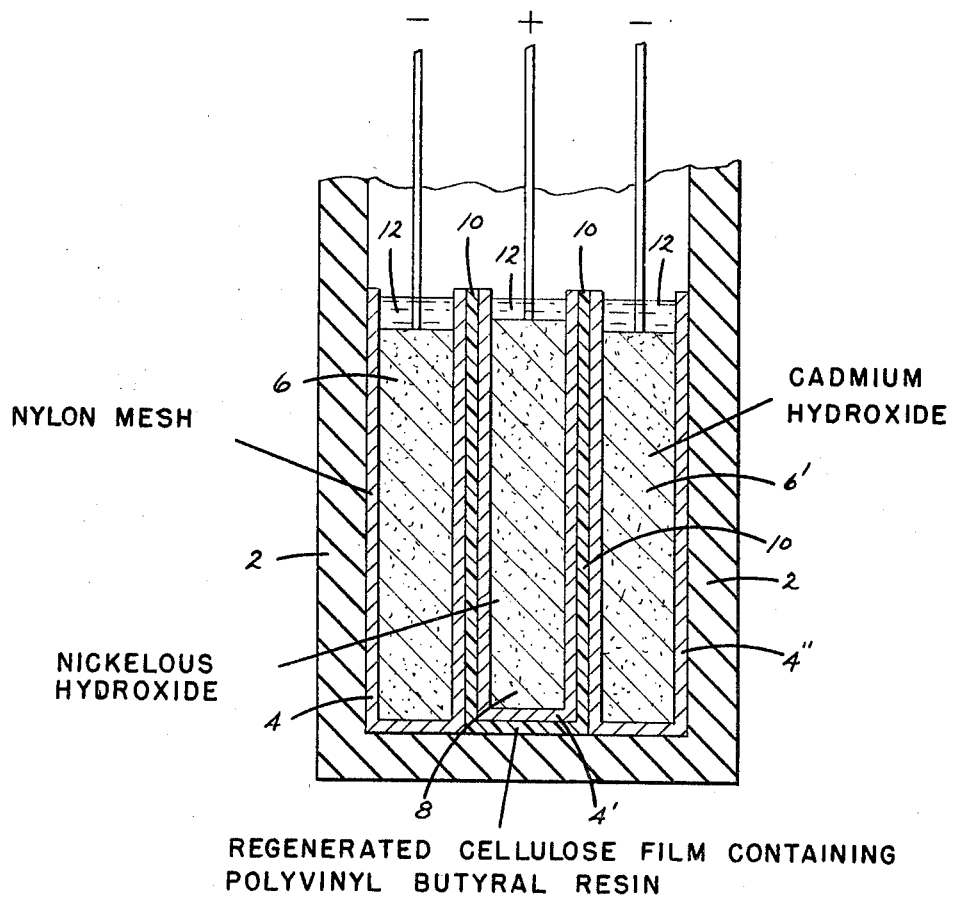
NYLON MESH
CADMIUM HYDROXIDE
NICKELOUS HYDROXIDE
REGENERATED CELLULOSE FILM CONTAINING POLYVINYL BUTYRAL RESIN 3,284,382
**POLYVINYL BUTYRAL RESIN MODIFIED CELLU-
   LOSE BATTERY SEPARATOR AND METHOD
   FOR PREPARATION**
Charles M. Rosser, Wallingford, and Richard A. Glinski,
  Clifton Heights, Pa., assignors, by mesne assignments to
  FMC Corporation, San Jose, Calif., a corporation of
  Delaware
       Filed May 11, 1962, Ser. No. 194,101
           6 Claims. (Cl. 260—17.4)

It is known to use semi-permeable cellulose membranes to separate battery electrodes which permit the transfer of electrolyte ions but prevent the migration of larger metallic particles from one electrode to the other. The cellulosic membranes which are used as electrode separators in batteries are required to be extremely resistant to oxidative deterioration caused by prolonged contact with strong acid or alkaline electrolyte solutions. In addition, the separator membrane is subjected to certain physical stress caused by the formation of deposits at the electrodes which are capable of penetrating weaker films. Various processes and pretreatments have been used to improve the oxidation resistance and mechanical strength of the cellulose membranes. However, all of these are comparatively expensive and not easily adapted to manufacture on a continuous basis.

It is an object of this invention to provide an oxidation-resistant, cellulose pellicle having increased mechanical strength.

It is another object of this invention to provide a process for the manufacture of an oxidation-resistant cellulose pellicle having increased mechanical strength.

It is still another object of this invention to provide an electro-chemical generator including oxidation-resistant, high strength cellulose separators.

These and other objects are accomplished in accordance with this invention which comprises a non-fibrous regenerated cellulose sheet, having uniformly dispersed therein a minor proportion of polyvinyl butyral resin. The non-fibrous regenerated cellulose sheet is preferably a de-esterified cellulose ester including denitrated cellulose nitrate and deacetylated cellulose acetate. The polyvinyl butyral resin is preferably present in the cellulose sheet in an amount ranging from about 5 to 35% based on the weight of the sheet.

Polyvinyl butyral resin is a well known and commercially available material prepared by the reaction of partially or completely hydrolyzed polyvinyl acetate and butyraldehyde. The resins range in molecular weight from less than about 20,000 to about 500,000 and over.

This invention also includes a process of making an oxidation-resistant cellulose sheet which comprises casting a sheet of an organic solvent solution of a cellulose ester and polyvinyl butyral resin, removing the solvent and de-esterifying the cellulose ester sheet. In the case of nitrocellulose, a sheet of a mixture of a collodion composed of nitrocellulose, a solvent comprising ethyl ether and ethyl alcohol, and polyvinyl butyral resin is cast in an aqueous medium containing alcohol and ether. Thereafter the sheet is washed and denitrated by immersing into a de-oxidizing (reducing) bath containing, for example, an aqueous solution of ammonium hydrosulfide. The denitrated films are then washed and dried.

In the case of fatty acid cellulose esters, for example, cellulose acetate, cellulose formate, cellulose propionate, etc., the cellulose ester is dissolved in a volatile solvent such as an acetone and the solution admixed with a solution of polyvinyl butyral resin dissolved in a similar solvent material. This solution is cast into a sheet and the solvent evaporated. The sheet is then washed and saponified, for example, by immersion into dilute aqueous solution of sodium hydroxide.

The resin-containing cellulose sheet of this invention is advantageously employed in a battery containing an alkaline electrolyte medium. The positive electrode of the battery in which the cellulose sheet is preferably used as either a silver or nickel containing electrode, while the negative electrode is preferably either a cadmium or zinc-containing electrode.

A specific embodiment of this invention is seen in the accompanying drawing in which 2 is the battery casing. 4, 4' and 4" are permeable nylon separators. In general, any oxidation-resistant cellulosic or synthetic resin fabric or mesh is useful for the permeable separator. 6 and 6' are negative electrodes of cadmium hydroxide, and 8 is a positive electrode or nickelous hydroxide. 10 represents one or more layers of semi-permeable membrane which is a non-fibrous regenerated cellulose sheet having uniformly dispersed therein about 15% based on the weight of the cellulose of polyvinyl butyral resin. 12 is the electrolyte solution which, in this embodiment, is an aqueous solution of 35% potassium hydroxide.

The following example is set forth to demonstrate the oxidation-resistant cellulose sheet of this invention and the method for its preparation.

EXAMPLE

Cellulose nitrate films were cast from collodions composed of 20% cellulose nitrate, 25% ethyl ether, 49% ethyl alcohol and 6% water. Portions of polyvinyl butyral resin having an average molecular weight of about 50,000, in amounts of between about 9% and 33% based on the weight of the cellulose nitrate, were added to the solvent portion prior to cellulose nitrate addition. The solutions were mechanically mixed to obtain homogeneous viscous liquids.

The laboratory casting procedure consisted of placing a portion of the highly viscous collodion between two sheets of untreated regenerated cellulose film, pressing this arrangement in a Carver press until a collodion sheet of 10 to 12 mils thickness was obtained. The entire composite sheet was then immersed in a coagulating bath containing 52% ethyl alcohol, 48% water, and 2% ethyl ether for 3 minutes at room temperature. During the stay in this bath the cellulose nitrate films were separated from the regenerated cellulose supporting films. Following this the cellulose nitrate films were placed in a wash bath containing 94% water, 6% ethyl alcohol, and a trace of ethyl ether for 15 minutes at room temperature. The films were then washed with copious amounts of water.

Denitration of the films was accomplished using an aqueous solution of 5% ammonium hydrosulfide with added small amounts of sodium sulfide and ammonium sulfate. The denitration process was completed within 3 to 5 hours. The regenerated films were then washed in running water for several hours, followed by a desulfurization treatment in an aqueous solution containing .05% sodium hydroxide and 1% sodium sulfide at 60° C. for 15 minutes. The films were again washed and then dried.

The oxidation resistance of the resin-impregnated cellulose films to strong alkali conditions was determined using a test which is accepted in some commercial battery laboratories as correlating the film life in a battery. The test consists of attaching a standard metal weight to a test film strip of fixed dimensions and suspending it in a flask containing 45% potassium hydroxide so that one half of the film remains above the liquid level while the remaining portion, including the weight, is submerged in the caustic solution. The flask is then placed in an oven maintained at 57° C. and the length of time required for the breaking of the film to occur is noted. The results of this test are set forth in the following table.

*Table I*

| Amount of resin in film (percent): | Hours before break (avg.) |
|---|---|
| 0 | 22 |
| 9.1 | 99 |
| 16.6 | 133 |
| 33.3 | 188 |

It is obvious that the inclusion of the polyvinyl butyral resin increases the oxidation resistance of cellulose film. It was found that care must be taken to thoroughly mix the resin with the cellulose nitrate solution prior to casting so that the resin is uniformly dispersed therein. Where this is not done, the hours before breaking drop down to about the same as de-esterified cellulose ester film having no resin therein.

The wet tensile strength of the resin-modified cellulose sheets prepared as described above was tested using a Suter Tester, a recognized test apparatus designed to measure the force necessary to pull sheets apart. The result of these tests using a 1500 gm. weight attached to the Suter Tester are set forth in the following table. The films used had a thickness of 4 mils when dry and 9 mils when re-wet. The test was performed on the re-wet, one inch wide film strips.

*Table II*

| Amount of resin in film (percent): | Re-wet tensile strength (avg. gms.) |
|---|---|
| 0 | 3214 |
| 9.1 | 3841 |
| 16.6 | 5502 |

Various changes and modifications may be made in practicing the invention without departing from the spirit and scope thereof and, therefore, the invention is not to be limited except as defined in the appended claims.

We claim:
1. A non-fibrous regenerated cellulose sheet having uniformly dispersed therein a minor proportion of polyvinyl butyral resin.
2. A non-fibrous de-esterified cellulose ester sheet having uniformly dispersed therein a minor proportion of a polyvinyl butyral resin.
3. A non-fibrous denitrated cellulose nitrate sheet having uniformly dispersed therein a minor proportion of polyvinyl butyral resin.
4. The sheet of claim 3 wherein the polyvinyl butyral resin is present in an amount ranging from about 5 to 35% based on the weight of the sheet.
5. A method of making an oxidation-resistant cellulose sheet which comprises casting a sheet of an organic solvent solution of a cellulose ester and polyvinyl butyral resin, removing the solvent, and de-esterifying the cellulose ester.
6. A method of making an oxidation-resistant cellulose sheet which comprises casting a sheet of collodion containing polyvinyl butyral resin, removing the solvent, denitrating the cellulose nitrate in a deoxidizing bath, washing, and drying said sheet.

References Cited by the Examiner

UNITED STATES PATENTS

| 2,361,000 | 10/1944 | Zender | 117—144 |
| 2,696,515 | 12/1954 | Koren et al. | 136—146 |
| 2,950,992 | 8/1960 | Brillhart et al. | 117—144 |
| 3,013,099 | 12/1961 | Mendelsohn | 136—146 |

WILLIAM H. SHORT, *Primary Examiner.*

JOHN R. SPECK, *Examiner.*

D. L. WALTON, *Assistant Examiner.*